US011290623B2

(12) United States Patent
Darvas (10) Patent No.: US 11,290,623 B2
(45) Date of Patent: Mar. 29, 2022

(54) MULTI-SENSOR IRRADIANCE ESTIMATION

(71) Applicant: MicaSense, Inc., Seattle, WA (US)

(72) Inventor: Felix Darvas, Seattle, WA (US)

(73) Assignee: MicaSense, Inc., Seattle, WA (US)

( * ) Notice: Subject to any disclaimer, the term of this patent is extended or adjusted under 35 U.S.C. 154(b) by 0 days.

(21) Appl. No.: 16/037,952

(22) Filed: Jul. 17, 2018

(65) Prior Publication Data

US 2018/0343367 A1 Nov. 29, 2018

Related U.S. Application Data

(63) Continuation-in-part of application No. PCT/US2017/066524, filed on Dec. 14, 2017.
(Continued)

(51) Int. Cl.
*H04N 5/225* (2006.01)
*G06T 7/00* (2017.01)
*H04N 5/247* (2006.01)
*G05D 1/00* (2006.01)
*G01J 1/42* (2006.01)
(Continued)

(52) U.S. Cl.
CPC .......... *H04N 5/2253* (2013.01); *G01J 1/0266* (2013.01); *G01J 1/4204* (2013.01); *G01J 1/4228* (2013.01); *G05D 1/0088* (2013.01); *G06T 7/0004* (2013.01); *H04N 5/247* (2013.01); *B64C 39/024* (2013.01);
(Continued)

(58) Field of Classification Search
CPC ............ B64C 2201/123; B64C 39/024; H04N 5/2253; H04N 5/247; G01J 1/0266; G01J 1/0425; G01J 1/4204

USPC ........................................................ 348/117
See application file for complete search history.

(56) References Cited

U.S. PATENT DOCUMENTS 5,010,244 A * 4/1991 Nissborg ................. G01S 3/783
250/206.1
6,417,500 B1 7/2002 Wood
(Continued)

FOREIGN PATENT DOCUMENTS

CN 101750068 A 6/2010
CN 104006879 A 8/2014
(Continued)

OTHER PUBLICATIONS

Hämäläinen et al., "A Mutisensor Pyranometer for Determination of the Direct Component and Angular Distribution of Solar Radiation," *Solar Energy* 35(6):511-525, 1985.
(Continued)

*Primary Examiner* — Kathleen V Nguyen
(74) *Attorney, Agent, or Firm* — Seed Intellectual Property Law Group LLP (57) ABSTRACT

The present disclosure is directed to devices and methods for simultaneously sensing irradiance with multiple photo sensors having different orientations, and determining direct and scattered components of the irradiance. One such device includes an aerial vehicle and an irradiance sensing device. The irradiance sensing device includes a base structure mounted to the aerial vehicle, and the base structure including a plurality of surfaces. A plurality of photo sensors are arranged on respective surfaces of the base structure, with each photo sensor having a different orientation.

18 Claims, 7 Drawing Sheets

Related U.S. Application Data (60) Provisional application No. 62/447,273, filed on Jan. 17, 2017.

(51) Int. Cl.
*G01J 1/02* (2006.01)
*G01J 1/04* (2006.01)
*B64C 39/02* (2006.01)

(52) U.S. Cl.
CPC ....... *B64C 2201/123* (2013.01); *G01J 1/0425* (2013.01); *G06T 2207/30188* (2013.01)

(56) References Cited

U.S. PATENT DOCUMENTS

| | | | |
|---|---|---|---|
| 7,664,225 B2 | 2/2010 | Klein | |
| 9,415,870 B1* | 8/2016 | Beckman | B64C 39/024 |
| 9,470,579 B2 | 10/2016 | Ritter et al. | |
| 2012/0200703 A1 | 8/2012 | Nadir et al. | |
| 2013/0126706 A1* | 5/2013 | Lynass | G01J 1/42 |
| | | | 250/208.1 |
| 2013/0152998 A1* | 6/2013 | Herzig | F24S 50/20 |
| | | | 136/246 |
| 2013/0266221 A1* | 10/2013 | Kaneko | G06T 15/506 |
| | | | 382/168 |
| 2014/0022381 A1 | 1/2014 | Heinold | |
| 2014/0118526 A1* | 5/2014 | Sutton | H04N 5/3696 |
| | | | 348/79 |
| 2014/0267596 A1* | 9/2014 | Geerds | H04N 5/2252 |
| | | | 348/38 |
| 2015/0367957 A1 | 12/2015 | Uskert et al. | |
| 2016/0069741 A1* | 3/2016 | Ritter | G01J 3/2823 |
| | | | 356/402 |
| 2016/0232650 A1* | 8/2016 | Christ | G01J 3/28 |
| 2016/0237745 A1* | 8/2016 | Wen | G01J 1/0271 |
| 2017/0276542 A1* | 9/2017 | Klawuhn | G01J 1/0242 |
| 2018/0027152 A1* | 1/2018 | Sheridan | H04N 5/2254 |
| | | | 348/47 |
| 2018/0143130 A1* | 5/2018 | Shearer | A01B 79/005 |
| 2019/0154498 A1* | 5/2019 | Mehrl | G01J 1/42 |

FOREIGN PATENT DOCUMENTS

| | | |
|---|---|---|
| CN | 204037916 U | 12/2014 |
| EP | 1 012 633 B1 | 3/2002 |
| JP | 51-38137 A | 3/1976 |
| JP | 2009-210280 A | 9/2009 |
| WO | 2016/040316 A1 | 3/2016 |

OTHER PUBLICATIONS

Schenato et al., "Attitude Control for a Micromechanical Flying Insect via Sensor Output Feedback," *IEEE Transactions on Robotics and Automation* 20(1):93-105, Feb. 2004.

Okayasu et al., "Utilization of Drone to Evaluate Growth Characteristics of Open Cultivation Crops," 2016, 6 pages.

\* cited by examiner

MULTI-SENSOR IRRADIANCE ESTIMATION

BACKGROUND

Technical Field

The present disclosure is directed to estimating or determining irradiance using an irradiance sensing device having a plurality of photo sensors with different orientations.

Description of the Related Art

A common problem in radiometric remote sensing is the estimation of incident irradiance from the sun on arbitrary surfaces from the scattered and direct component of the sunlight. Traditionally, these components of sunlight are measured on the ground, using a shaded pyranometer for the scattered component and a pyrheliometer for the direct component. Both of these devices track the position of the sun during measurement. The pyrheliometer has a long tube that only allows direct light in and the tracking shading of the pyranometer blocks direct light, so that the instruments measure only the direct and scattered light, respectively. Both instruments have significant cost and are unsuitable for mounting on a small, rapidly moving platform such as a drone.

A single conventional light sensor can be used to measure both components of sunlight, if the sensor attitude is well determined and the attitude is varied sufficiently over time. However, while such a sensor can be mounted on a drone, the precise attitude estimates for a moving platform are difficult to obtain, or require costly sensors and are prone to significant errors, particularly under changing light conditions, e.g. due to partial cloud cover.

Accordingly, in conventional remote sensing applications, such as multispectral imaging applications for determining the health of vegetation, ground-based calibration systems are typically employed for normalizing the effects of a variable light source (e.g., the sun) on multispectral images of a target. Such calibration systems commonly rely on the use of target calibration or reflectance panels having a known spectral reflectance that are placed in the field of view of a multispectral imaging device and can be used to calibrate the acquired image of the target. There are several drawbacks to such techniques, including that the calibration or reflectance panels are costly, cumbersome and do not accurately measure irradiance levels simultaneously with the acquired images.

BRIEF SUMMARY

The present disclosure is directed to devices and methods for sensing irradiance from a light source, such as the sun, by an irradiance sensing device including a plurality of photo sensors arranged at differing orientations. By simultaneously sensing the irradiance with multiple photo sensors having different orientations, particular components of the irradiance, such as the direct and scattered components and the incidence angle, may be determined. These determined irradiance components may be used to compensate or normalize images of a target that are acquired at the same time by an imaging device. The irradiance sensing device and the imaging device may be carried on an aerial vehicle, such as a drone.

In one embodiment, the present disclosure provides a device that includes an aerial vehicle and an irradiance sensing device. The irradiance sensing device includes a base structure mounted to the aerial vehicle, and the base structure includes a plurality of surfaces. The irradiance sensing device further includes a plurality of photo sensors, with each of the photo sensors being arranged on a respective surface of the base structure and having different orientations.

In another embodiment, the present disclosure provides a method that includes: simultaneously sensing irradiance by a plurality of photo sensors, each of the photo sensors having a different sensing orientation; acquiring image information associated with a target object; determining, by a processor, direct and scattered components of the sensed irradiance; and determining a reflectance of the target object based on the determined direct and scattered components and the acquired image information.

In yet another embodiment, the present disclosure provides a method that includes: simultaneously sensing irradiance by a plurality of photo sensors positioned on an aerial vehicle, each of the photo sensors having a different sensing orientation; transmitting information indicative of the sensed irradiance from the plurality of photos sensors to a processor; and determining, by the processor, direct and scattered components of the irradiance.

In another embodiment, the present disclosure provides a device that includes a structure and a plurality of photo sensors coupled to the structure. The photo sensors have different sensing orientations with respect to one another. In use, each of the photo sensors receives irradiance at a respective one of the sensing orientations. The different sensing orientations of the photo sensors include at least five different sensing orientations.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

The present disclosure is directed to systems and methods for measuring solar irradiance in radiometric remote sensing applications. Irradiance from a light source, such as the sun, may be simultaneously sensed by a plurality of photo sensors arranged at differing orientations on an irradiance sensing device. Components of the irradiance, such as the direct and scattered components and the incidence angle, may thus be determined, and utilized to compensate or normalize images of a target that are acquired at the same time by an imaging device.

Figure 1:
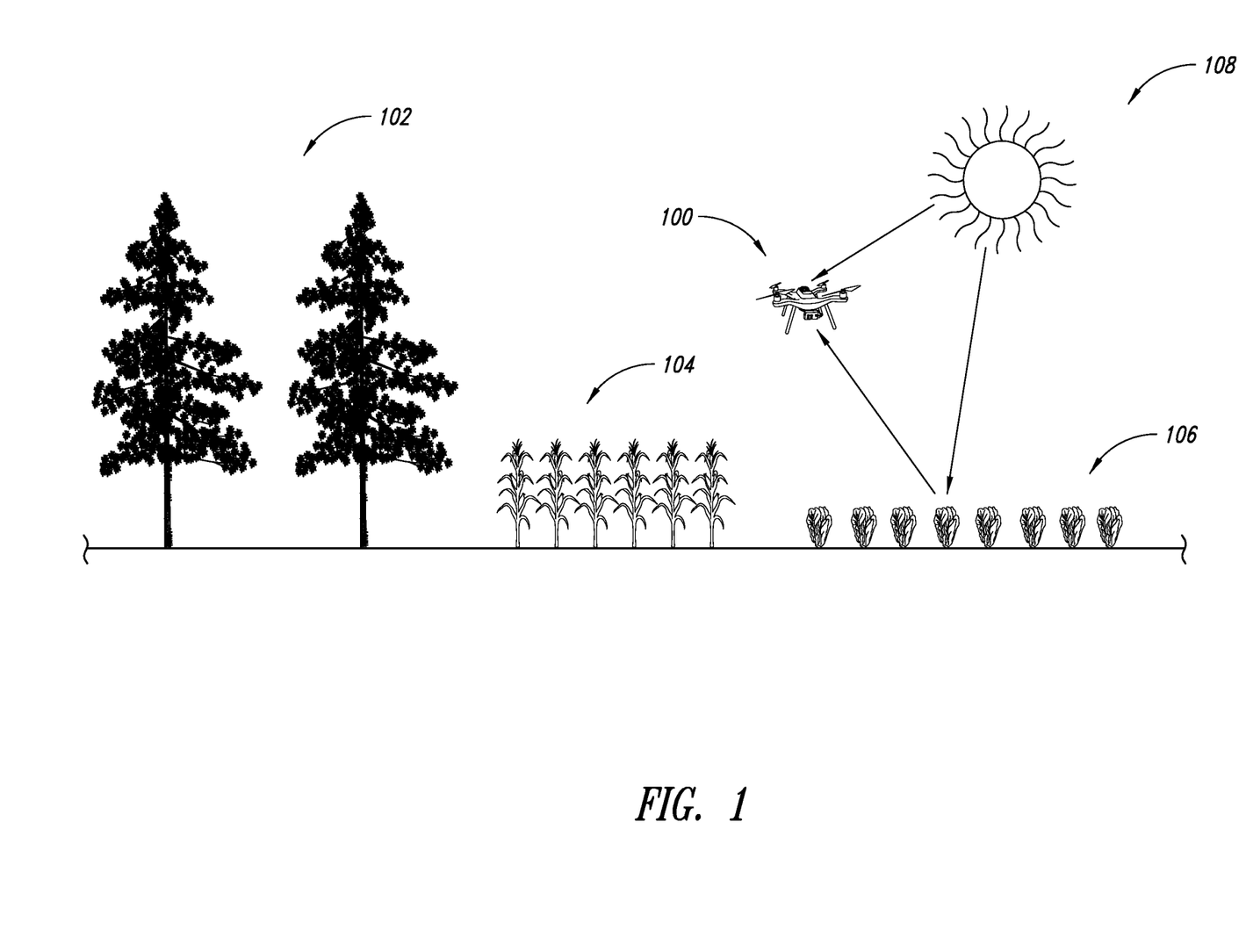
FIG. 1 is an illustration of an aerial vehicle for sensing irradiance and simultaneously obtaining an image of a target, in accordance with one or more embodiments of the present disclosure.
Figure 2:
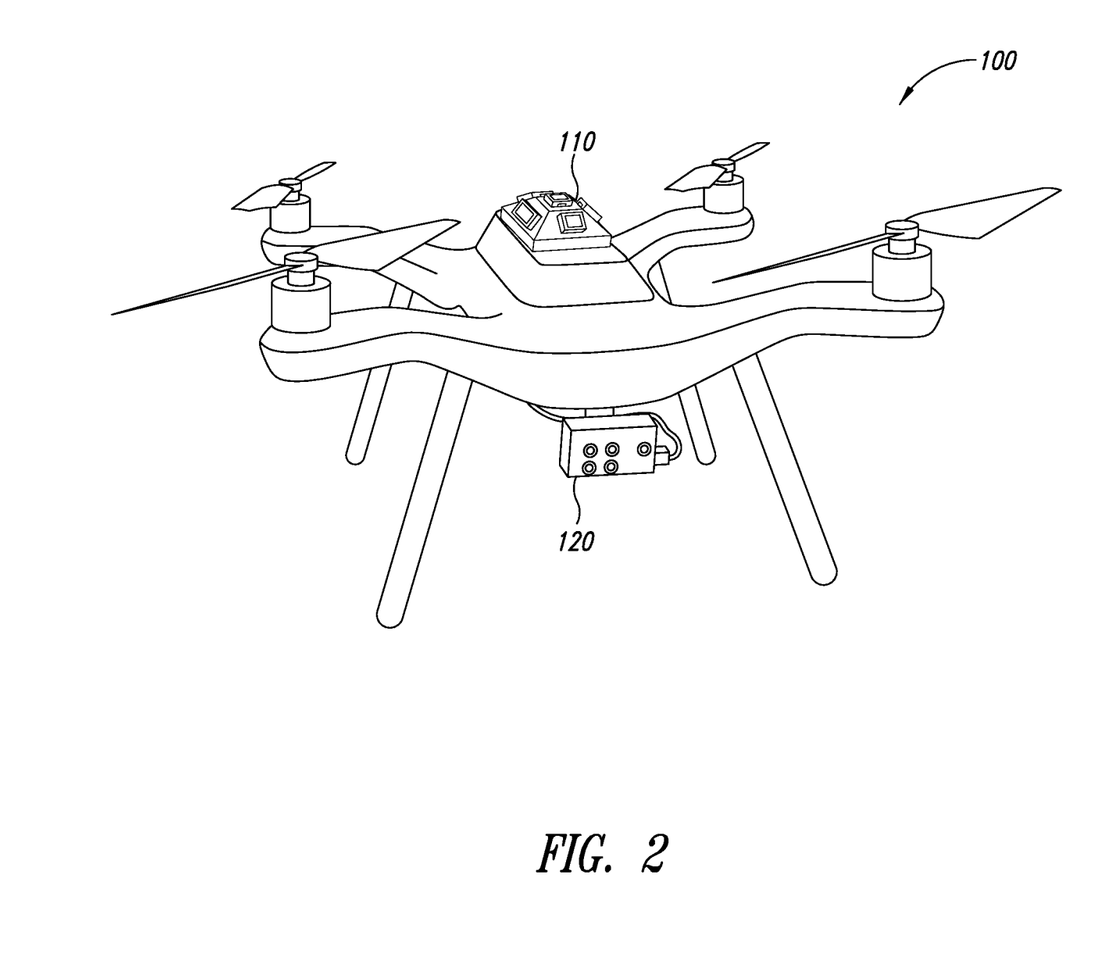
FIG. 2 is an illustration showing further details of the aerial vehicle of FIG. 1.

FIG. 1 illustrates an aerial vehicle 100 for sensing irradiance and simultaneously obtaining an image, for example, of a ground-based target, in accordance with one or more embodiments, and FIG. 2 illustrates further details of the aerial vehicle 100. Referring to FIGS. 1 and 2, the aerial vehicle 100 includes an irradiance sensing device 110 and an imaging device 120 for imaging a physical area or scene (i.e., a target). The irradiance sensing device 110 and the imaging device 120 may collect, store and/or output the obtained irradiance and image information.

The aerial vehicle 100 may be any type of aerial vehicle, including any rotary or fixed wing aerial vehicle, and may be an unmanned vehicle (as shown in FIG. 1) or manned aerial vehicle, such as an airplane or a drone. Additionally, the aerial vehicle 100 may be an autonomous vehicle, capable of autonomous flight (and autonomous acquisition of irradiance and image information), or may be a piloted vehicle (e.g., flown by a pilot in a manned vehicle, or by a remote pilot of an unmanned vehicle).

The imaged target (e.g., trees 102, crops 104, 106, a field of grass, a body of water or the like) receives irradiance from a light source, such as the sun 108. The target may be one or more distinct objects (e.g., a single tree, a building, a pond, etc.), an area or scene (e.g., a portion of a forest, a portion of a field of crops, a portion of a lake, etc.) or any other target for which the acquisition of an image may be desired.

The imaging device 120 may be a multispectral imaging device capable of acquiring spectral images of a target, and may include multiple imagers, with each such imager being tuned for capturing particular wavelengths of light that is reflected by the target. The imaging device 120 may be configured to capture reflected light in one or more of the ultraviolet, visible, near-infrared, and/or infrared regions of the electromagnetic spectrum.

Images acquired by such multispectral imaging devices may be utilized to measure or determine different characteristics of the target, such as the chlorophyll content of a plant, an amount of leaf area per unit ground area, an amount or type of algae in a body of water, and the like. In one or more embodiments, the imaging device 120 may be used to determine the reflectance of the imaged target.

The imaging device 120 may be mounted to the aerial vehicle 100 and oriented in any manner as may be desired. For example, the imaging device 120 may be mounted to a lower surface of the aerial vehicle 100 and positioned such that images of ground-based targets may be obtained.

The irradiance sensing device 110 may be mounted to an upper surface of the aerial device 100, and includes a plurality of photo sensors configured to simultaneously sense irradiance from a light source, such as the sun 108, at various different orientations with respect to the light source.

By simultaneously sensing irradiance by multiple photo sensors having different orientations, it is possible to determine particular characteristics of the light source, such as the direct and scattered components of solar irradiance, as well as an angle of incidence a of the solar irradiance. Moreover, the irradiance sensing device 110 may sense irradiance at the same time as images are acquired by the imaging device 120, which enables normalization or compensation of the acquired images to account for variations in received irradiance by the imaged target. For example, an image of a target acquired by the imaging device 120 on a cloudy day can be correlated to an image acquired of the same target on a cloudless day, by accounting for the differences in the irradiance sensed by the irradiance sensing device 110 at the time of acquiring each image.

Figure 3:
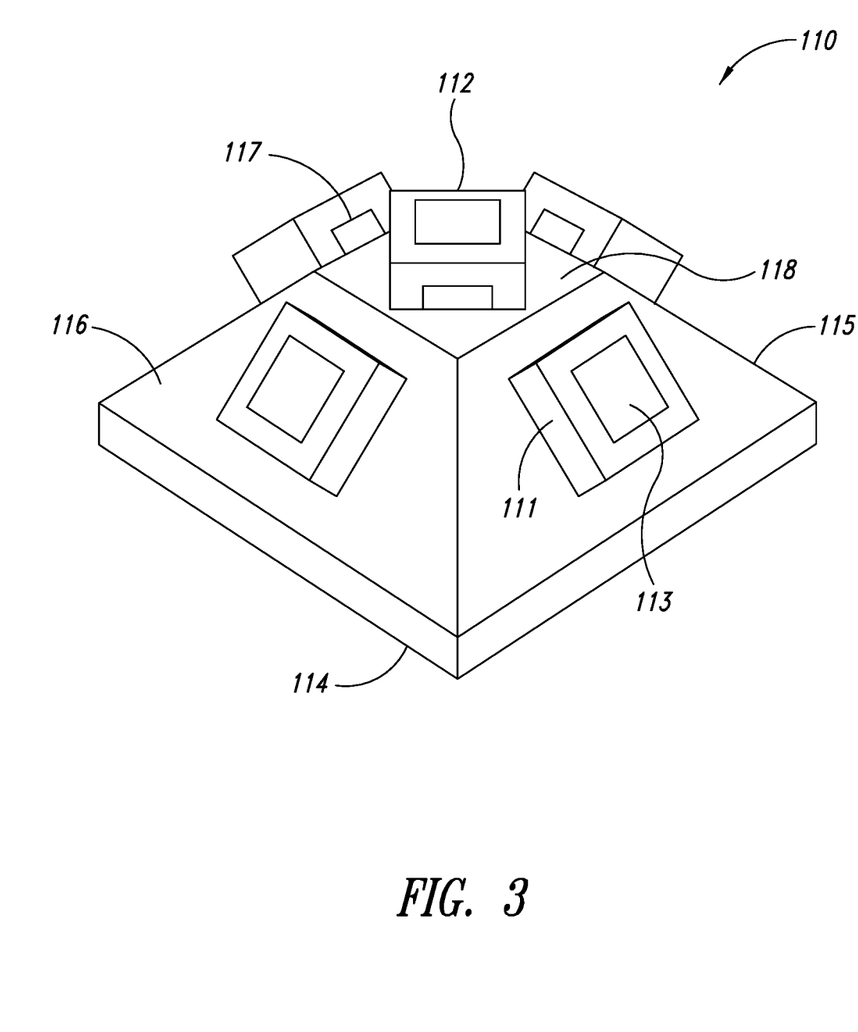
FIG. 3 is an illustration of an irradiance sensing device, in accordance with one or more embodiments of the present disclosure.

FIG. 3 illustrates the irradiance sensing device 110 in further detail, in accordance with one or more embodiments of the present disclosure. The irradiance sensing device 110 includes a plurality of photo sensors 112 arranged on different surfaces of a base 115. The base 115 includes a lower surface 114 that may be mounted, for example, to an upper surface of the aerial vehicle 100. Extending from the lower surface 114 is a plurality of inclined surfaces 116 on which the photo sensors 112 may be mounted. As shown in FIG. 3, in one or more embodiments, the base 115 may have a truncated square pyramid shape, with four inclined surfaces 116 extending between the lower surface 114 and a flat upper surface 118. One or more photo sensors 112 may be mounted on each of the inclined surfaces 116 and the upper surface 118. The photo sensors 112 may thus be oriented to receive and sense varying amounts or components (e.g., direct and scattered components) of irradiance from a light source such as the sun 108.

The base 115 may have any shape or form that includes a plurality of surfaces on which photo sensors 112 may be mounted and configured to sense irradiance from differing orientations. The irradiance sensing device 110 may preferably include at least four, and in one or more embodiments may include five, photo sensors 112. Accordingly, the base 115 may preferably include at least four, and in one or more embodiments may include five, surfaces having different orientations for mounting the photo sensors 112.

Each photo sensor 112 includes a housing 111 or some external packaging that houses electronic circuitry (such as one or more application specific integrated circuits, computer-readable memory and the like) for processing and/or storing received signals (e.g., signals indicative of the sensed irradiance), and a photo sensor surface 113 for sensing irradiance.

Each of the photo sensors 112 may include one or more ports 117 for communicating signals (e.g., one or more signals indicative of the sensed irradiance) to or from the photo sensors 112. In one or more embodiments, the photo sensors 112 may be coupled to a processor (e.g., by one or more electrical wires or cables coupled to the ports 117) that is included onboard the aerial vehicle 100. The processor may similarly be communicatively coupled to the imaging device 120. Accordingly, the processor may acquire the sensed irradiance by the photo sensors 112 at the same time as an image of a target is acquired by the imaging device 120. The irradiance sensed by the irradiance sensing device 110 may thus be correlated with the image that is simultaneously acquired by the imaging device 120.

Additionally or alternatively, the photo sensors 112 may store the sensed irradiance information as it is acquired during a flight of the aerial vehicle 100. Similarly, the imaging device 120 may store images acquired during the flight. The image and irradiance information may later be uploaded to a computing system, which may correlate the stored irradiance and image information based on the time of acquisition of such information, which may be provided through a time stamp or similar information that may be included with the irradiance and image information.

The base 115 may be at least partially hollow or may otherwise include an inner cavity, which reduces the weight of the irradiance sensing device 110. Further, additional components of the aerial vehicle 100, such as any electrical or electronic components, may be housed within the inner cavity of the base 115. For example, a processor and/or any other circuitry may be included within the base 115 and may be communicatively coupled to the photo sensors 112 and/or the imaging device 120.

For irradiance sensing by an aerial vehicle, an irradiance sensing device should provide an instantaneous estimate of both the direct and scattered components, independent of sensor attitude estimates (e.g., which may be provided from an imprecise IMU) and large movements of the aerial vehicle itself. While a single sensor cannot provide such estimates, a multisensor array such as the irradiance sensing device 110 provided herein can.

As will be demonstrated below, the direct and scattered components of solar irradiance at any particular time may be determined based on the sensed irradiance simultaneously acquired by a plurality of photo sensors 112 having different orientations.

For simplicity sake and without loss of generality, a sensor body coordinate system may be assumed that has a Z-axis oriented towards the current sun position. In such a coordinate system, the incidence angle $\alpha$ between the sun and a sensor depends only on two angles (the azimuth angle and the zenith angle), since the irradiance is invariant under rotations around the Z-axis.

Rather than trying to directly measure these angles, the azimuth and zenith angles may be treated as unknowns to be estimated along with the direct and scattered solar irradiance. Thus in total, we aim to determine four unknowns from a set of five (or more) independent irradiance measurements, which will give us five (or more) non-linear equations. Such a system is readily solvable by standard means, such as Newton's method or least squares.

A system of five sensors (e.g., as shown in FIG. 3) having the following configuration provides good results in simulation and allows a stable determination of all unknown quantities.

Note that the only inputs in this method are the known fixed photo sensor orientations and the measured irradiances. No assumptions about the time course of the direct and scattered irradiance are required and no attitudes need to be measured. The estimates of the components of the irradiance are instantaneous and as an added benefit, the photo sensor attitudes are provided in the special solar coordinate system.

It is noted that there are some special circumstances in which this method may not suitably determine the components of irradiance. One such circumstance exists in the absence of any direct light, in which the number of independent equations collapses to just one. However this is a special case that can easily be identified, as in this case all photo sensor readings should be the same, and equal to the scattered irradiance. Also, no meaningful results can be expected when the incidence angle becomes greater than 90 degrees for any photo sensor, a case which can be determined by use of an IMU. Note that in this case no particularly high accuracy from the IMU is required, as it is only needed to determine this special threshold. Also, in a situation with more than one dominant light source, as is the case when sunlight reflects off scattered clouds, the system will lock onto the strongest light source, which might not necessarily be the sun.

In view of the above, the irradiance sensing device 110 may have a known coordinate system, and a transformation exists and may be determined between the device coordinate system and the global coordinate system, as the position of the sun at any given time is known.

Accordingly, irradiance sensed simultaneously by each of the photo sensors 112 of the irradiance sensing device 110 may be utilized to determine (e.g., by a processor) the direct and scattered components of solar irradiance (as well as the incidence angle $\alpha$, the azimuth angle $\phi$ and the zenith angle $\theta$) that is incident at a particular time on a target that may be imaged by the imaging device 120.

Figure 4:
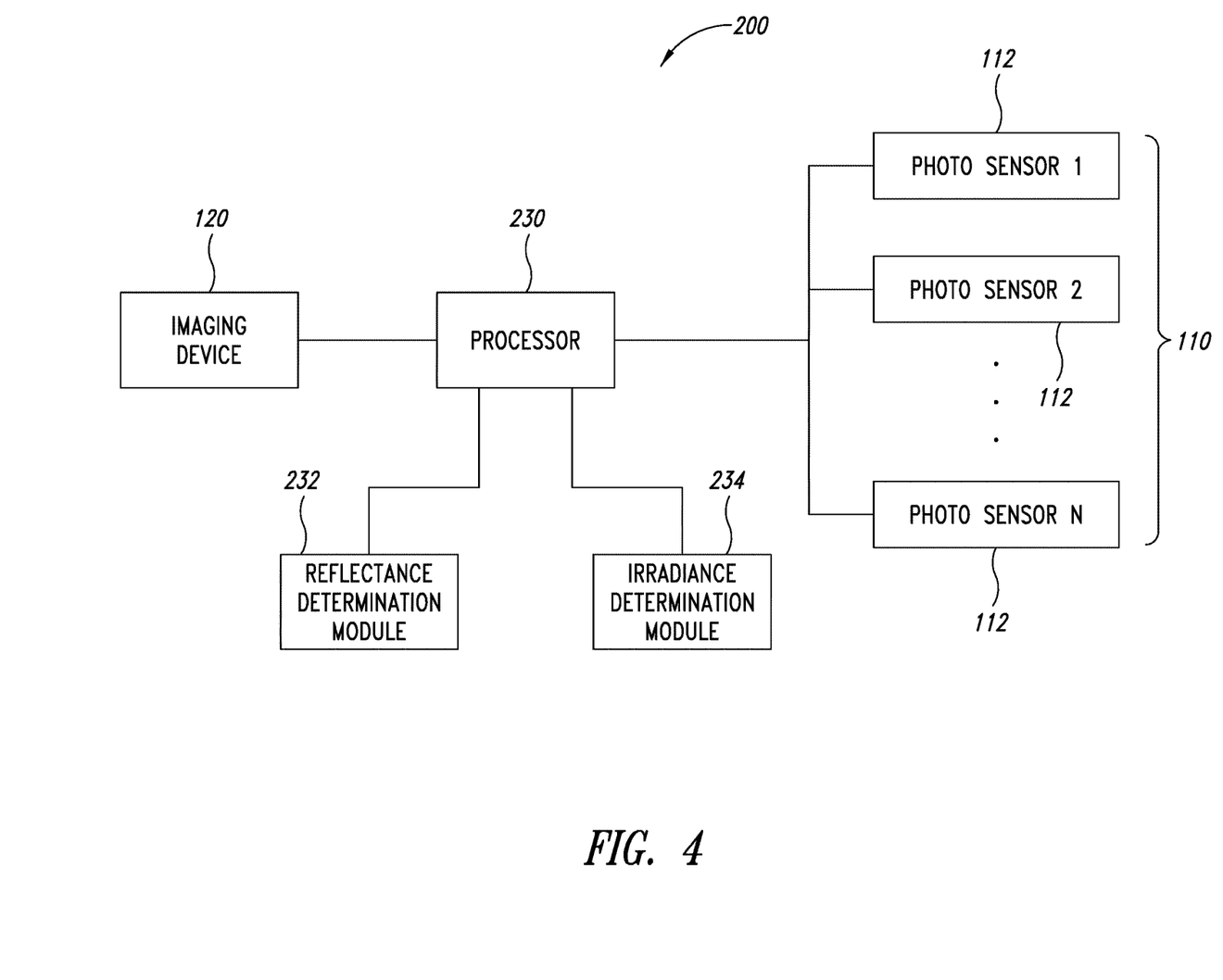
FIG. 4 is a block diagram illustrating a system for estimating or determining irradiance, based on irradiance sensed from a plurality of photo sensors, and for determining the reflectance of an imaged object, in accordance with one or more embodiments of the present disclosure.

FIG. 4 is a block diagram illustrating a system 200 for estimating or determining irradiance, based on the sensed irradiance from a plurality of photo sensors (e.g., as sensed by the irradiance sensing device 110), and for determining the reflectance of an imaged target or object. The system 200 may include a processor 230 that is communicatively coupled to the imaging device 120 and the irradiance sensing device 110 (including photo sensors 1 to N).

As noted previously herein, the processor 230 may be included onboard the aerial vehicle 100 (e.g., housed within a cavity in the base 115, or at any other location on the aerial vehicle 100). In other embodiments, the processor 230 may be included as part of a post-processing computer to which the irradiance sensing device 110 and/or the imaging device 120 may be coupled after an imaging session by the aerial vehicle 100. The post-processing computer may thus determine the components of the sensed irradiance based on the data collected and stored by the irradiance sensing device 110. Similarly, the imaging device 120 may capture and store data, which may later be provided to and processed by the processor 230.

Additionally, the processor 230 and/or instructions performed by the processor 230 (e.g., for determining irradiance components, reflectance values, etc.) may be located in the cloud, i.e., a remote distributed computing network that receives the collected data wirelessly from the imaging device 120 and the irradiance sensing device 110 or receives the data through a wired network once the imaging device 120 and irradiance sensing device 110 are coupled to a computer after the imaging session.

The processor 230 receives the sensed irradiance information from the irradiance sensing device 110 and the acquired image information from the imaging device 120. The processor 230 may access an irradiance determination module 234, which contains computer-readable instructions for determining the direct and scattered components of solar irradiance (and may further determine the incidence angle $\alpha$, the azimuth angle $\phi$ and the zenith angle $\theta$) based on the simultaneously sensed irradiance information from the plurality of photo sensors 112, as described herein.

The processor 230 may provide the determined direct and scattered components of solar irradiance to a reflectance determination module 232, along with image information of a target that was acquired by the imaging device 120 at the same time that the irradiance information was acquired. The reflectance determination module 232 may include computer-readable instructions for determining the reflectance of the target based on the image information of the target (which may indicate, for example, an amount of light reflected by the target) and the determined components of irradiance at the time the image information was acquired. Accordingly, the determined reflectance of an imaged target may be normalized or compensated to account for different irradiance levels that may be present at the time of imaging a target. For example, a determined reflectance for a target based on an image of the target acquired on a cloudy day will be the same or substantially the same as the reflectance for that same target that is determined based on an image of the target that was acquired on a cloudless day.

A compensation factor may thus be determined by the processor 230 (based on the determined components of irradiance) and may be applied by the reflectance determination module 232 for every image that is acquired by the imaging device 120, in order to accurately determine the reflectance of the imaged target, regardless of the lighting conditions at the time the image was acquired.

Figure 5:
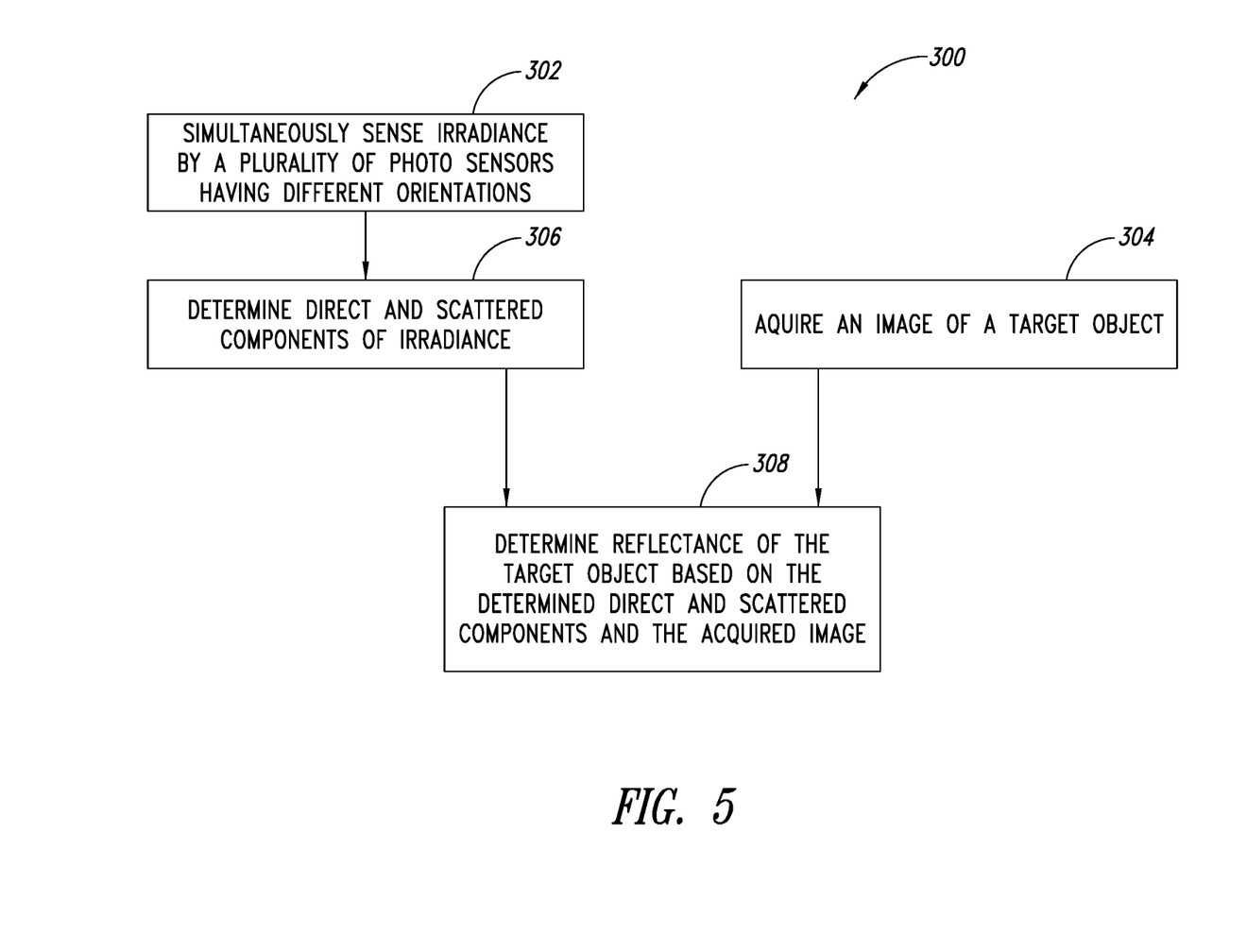
FIG. 5 is a flowchart illustrating a method of determining direct and scattered components of sensed irradiance, and determining reflectance of an imaged target based on the determined direct and scattered components, in accordance with one or more embodiments of the present disclosure.

FIG. 5 is a flowchart 300 illustrating a method of the present disclosure. At 302, the method includes simultaneously sensing irradiance from a light source by an irradiance sensing device 110 including a plurality of photo sensors 112 having different orientations with respect to the light source. The photo sensors 112 may be arranged, for example, as shown in the irradiance sensing device 110 of FIG. 3. The photo sensors 112 may be included onboard an aerial vehicle 100, and the irradiance may thus be sensed while the aerial vehicle 100 is in flight.

At 304, the method includes acquiring an image of a target object by an imaging device 120. The image may be acquired at the same time as the irradiance sensing device 110 senses irradiance, and the image and irradiance information may thus be correlated.

At 306, the method includes determining direct and scattered components of the sensed irradiance. And at 308, the method includes determining the reflectance of the target object based on the determined direct and scattered components of the sensed irradiance, and the acquired image of the target object. This method thus provides inherently compensated or normalized reflectance measurements of a target, such as vegetation, that are independent of changes in irradiance from a variable light source (e.g., the sun), and does not require an IMU or calibration of the imaging device. The method may be performed for each image acquired by the imaging device 120.

As is well known, different materials reflect and absorb incident irradiance differently at different wavelengths. Thus, targets can be differentiated based on their spectral reflectance signatures in remotely sensed images. Reflectance is a property of materials and is generally defined as the fraction of incident irradiance that is reflected by a target. The reflectance properties of a material depend on the particular material and its physical and chemical state (e.g., moisture), as well as other properties such as surface texture and other properties that may be known in the relevant field.

The various embodiments provided herein may be thus be utilized in a variety of applications in which determining reflectance of one or more imaged targets may be desirable. For example, by measuring or determining the reflectance of a plant at different wavelengths, areas of stress in a crop may be identified. Moreover, determined changes in reflectance of surface features such as vegetation, soil, water and the like can be utilized to determine the development of disease in crops, growth of algae in a body of water, changes in the chemical properties of ground or soil, and so on.

Various other applications are contemplated by the present disclosure. For example, embodiments provided herein may be utilized in navigational applications, since the orientation of the irradiance sensing device 110 is determined with respect to the position of the sun. That is, the orientation of the irradiance sensing device 110 may be mapped to the global or horizontal coordinate system, as described above, which may thus be used for navigational purposes by any vehicle including the irradiance sensing device 110.

Additionally, it will be appreciated that flight parameters of the aerial vehicle 100, including pitch, heading and roll, may be determined based on the irradiance sensed by the photo sensors 112 of the irradiance sensing device 110, and the determined components of the irradiance. As noted previously herein, the estimates of the components of the irradiance are instantaneous and the photo sensor attitudes are provided in the special solar coordinate system. Moreover, the orientation of the irradiance sensing device 110 may be mapped to the global or horizontal coordinate system, as described herein. Accordingly, the determined photo sensor attitudes (including, pitch, heading and roll information) provided in the special solar coordinate system may be mapped to the global or horizontal coordinate system for an indication of the aerial vehicle's 100 attitude with respect to the Earth. Additionally, changes in the determined photo sensor pitch, heading and roll during flight may be utilized for navigational purposes.

Figure 6:
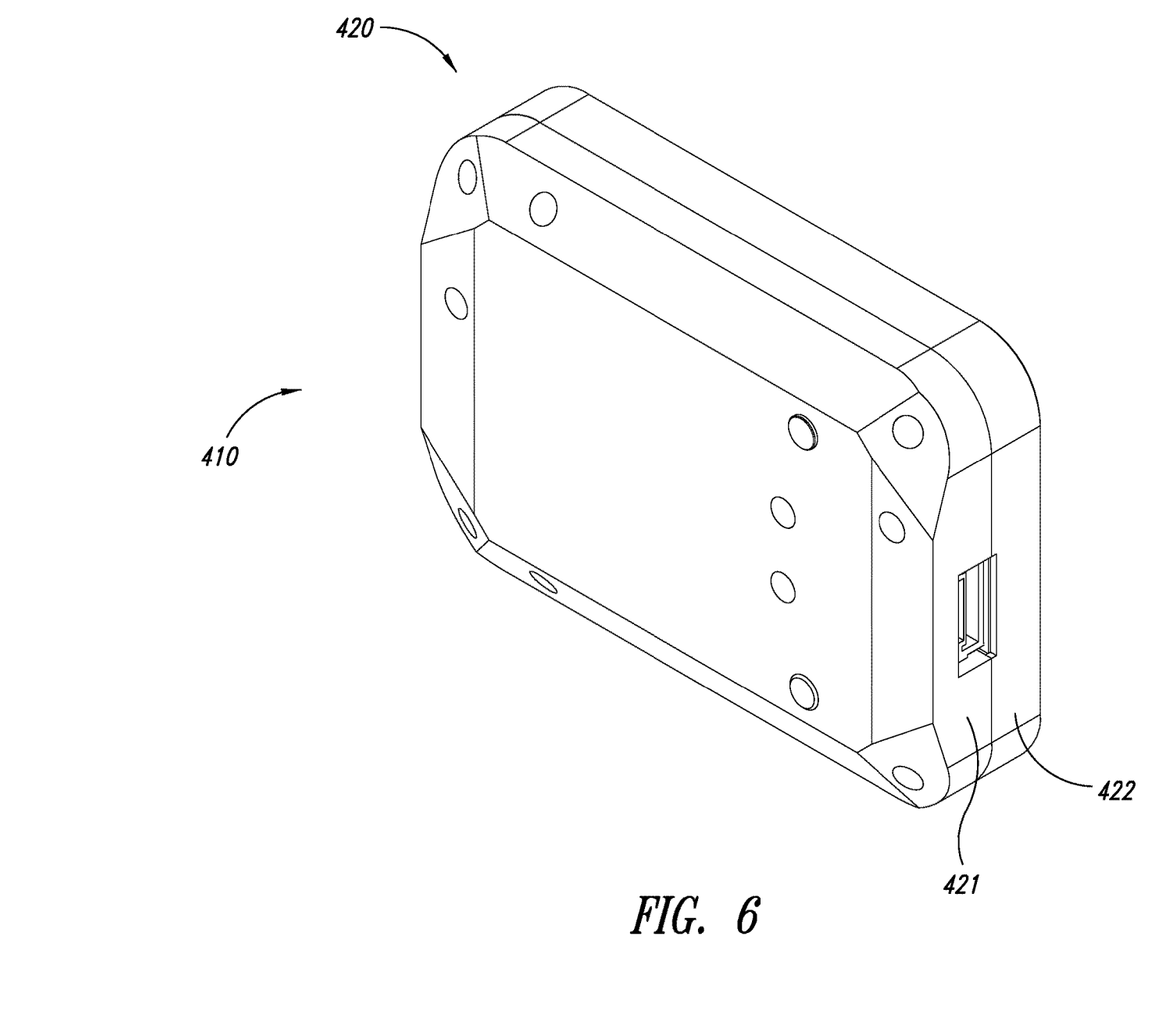
FIG. 6 is an illustration of an irradiance sensing device, in accordance with one or more embodiments of the present disclosure.
Figure 7:
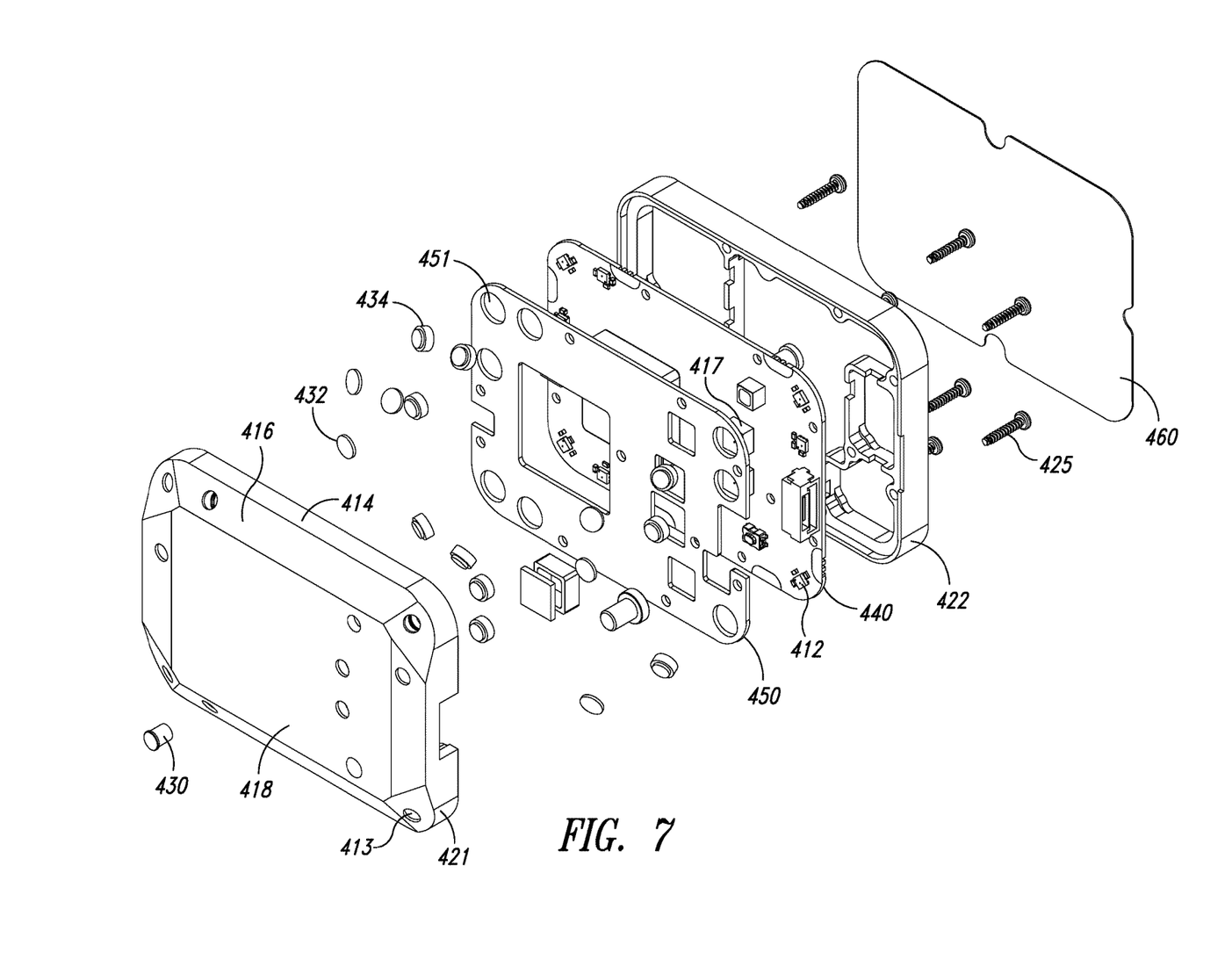
FIG. 7 is an exploded view illustration of the irradiance sensing device shown in FIG. 6, in accordance with one or more embodiments of the present disclosure.

FIG. 6 illustrates an irradiance sensing device 410, in accordance with one or more embodiments of the present disclosure. FIG. 7 is an exploded view illustrating further details of the irradiance sensing device 410, in accordance with one or more embodiments.

The irradiance sensing device 410 is similar in some respects to the irradiance sensing device 110 shown in FIG. 3 and described above. For example, the irradiance sensing device 410 includes a plurality of irradiance sensing surfaces arranged at different orientations and photo sensors configured to receive and sense varying amounts or components (e.g., direct and scattered components) of irradiance from a light source such as the sun. The irradiance sensing device 410 can be attached to an aerial vehicle and communicatively coupled to an imaging device, such as the aerial vehicle 100 and imaging device 120 shown in and described with respect to FIG. 2.

With reference to FIGS. 6 and 7, the irradiance sensing device 410 includes a housing 420 which forms outer surfaces of the device 410. In some embodiments, the housing 420 may include two or more pieces that are securable to one another by any suitable elements, including, for example, by one or more of a fastener, adhesive material, hinges, or the like. As shown in FIG. 6, in some embodiments the housing 420 includes a top enclosure 421 and a bottom enclosure 422. First and second internal boards 440, 450 may be included between the top and bottom enclosures 421, 422. In some embodiments, the top enclosure 421, the first and second internal boards 440, 450, and the bottom enclosure 422 are secured to one another by a plurality of screws 425, which may be, for example, self-tapping screws. In some embodiments, a label 460 may be affixed to a back surface of the bottom enclosure 422.

The top enclosure 421 includes a plurality of inclined surfaces 416 which extend in different orientations between respective edges or lower surfaces 414 and an upper surface 418 of the top enclosure 421. As shown in FIG. 7, in some embodiments, the top enclosure 421 includes eight inclined surfaces 416 and one upper surface 418, each of which may be considered as an irradiance sensing surface of the irradiance sensing device 410.

A plurality of irradiance sensing openings 413 extend through the inclined surfaces 416 and/or the upper surface 418. In some embodiments, each of the inclined surfaces 416 and the upper surface 418 includes at least one irradiance sensing opening 413.

A plurality of photo sensors 412 is arranged on the first internal board 440, which may be a mounting structure for mounting the photo sensors 412, and in some embodiments carries various electronic circuitry, components, or the like included in the irradiance sensing device 410. In some embodiments, the first internal board 440 includes conductive traces that electrically couple components on the board 440 to each other. In some embodiments, the first internal board 440 is a printed circuit board (PCB).

The photo sensors 412 may be mounted on the first internal board 440 in locations that correspond with locations of the irradiance sensing openings 413. That is, when the top enclosure 421 and the bottom enclosure 422 are secured to one another, with the first internal board 440 in between, each of the photo sensors 412 is near a corresponding irradiance sensing opening 413. Light pipes 430 are positioned in the irradiance sensing openings 413. The light pipes 430 may be any physical structure capable of transmitting or distributing received irradiance from outside of the housing 420 into an interior of the housing 420, and more particularly, toward each of the photo sensors 412. The light pipes 430 may have a hollow structure or a solid structure. In some embodiments, the light pipes 430 are not included.

Optical filters 432, which may be infrared (IR) blocking filters, and optical diffusers 434 may be positioned between the top enclosure 421 (e.g., behind the light pipes 430) and corresponding photo sensors 412. In some embodiments, one or more light pipes 430 and photo sensors 412 do not have a filter 432 and/or diffuser 434 therebetween. The diffusers 434 may be any optical diffuser suitable to diffuse received light, and in some embodiments, the diffusers 434 formed of polytetrafluoroethylene (PTFE), or Teflon.

In some embodiments, the second internal board 450 is positioned within the housing 420, between the top enclosure 421 and the first internal board 440. In some embodiments, the second internal board 450 is a pliable gasket, which may be a rubber gasket. The second internal board 450 may include openings 451 which are sized to fit over corresponding components on the first internal board 440, such as the photo sensors 412. In some embodiments, the openings 451 may hold the diffusers 434 and/or the filters 432 in desired positions, such as at a desired position and distance with respect to a corresponding photo sensor 412. The second internal board 450 may be positioned on the first internal board 440, with the photo sensors 412 being accommodated within the openings 451. The openings 451 may operably confine light that is received through corresponding openings 413 in the top enclosure 421 so that the received light is transmitted only into the corresponding opening 451 and the photo sensor 412 positioned within the opening 451. In some embodiments, the openings 413 in the top enclosure 421 are formed through optical channels (e.g., tubes or cavities that form a part of the top enclosure 421) that extend from respective front surfaces of the top enclosure 421 to end surfaces which may be positioned adjacent to or within a corresponding opening 451 of the second internal board 450.

The photo sensors 412 may be configured to sense irradiance having various different wavelengths. For example, in one or more embodiments, the photo sensors 412 includes one or more broadband photo sensors that sense ambient light or irradiance and one or spectral sensors 417 that sense light having specific wavelengths or ranges of wavelengths across the electromagnetic spectrum. In some embodiments, broadband photo sensors are configured to sense light through the irradiance sensing openings 413 of the inclined surfaces 416, while spectral sensors 417 are configured to sense light through the irradiance sensing openings 413 on the upper surface 418 of the top enclosure 421.

Various electronic circuitry (such as one or more application specific integrated circuits, computer-readable memory and the like) for processing and/or storing received signals (e.g., signals indicative of the sensed irradiance), may be attached to one or both of the first internal board 440 and the second internal board 450.

Each of the photo sensors 412 may be communicatively coupled to a processor (e.g., wirelessly coupled, or coupled by one or more electrical wires or cables) and, during operation, may communicate signals (e.g., one or more signals indicative of the sensed irradiance) to or from the processor. The processor may be configured to perform any of the functions described herein, including, for example, determining directed and scattered components of sensed irradiance, receiving acquired images, determining the reflectance of a target object based on determined direct and scattered components of sensed irradiance and an acquired image, storing information or causing information to be stored, correlating information, determining orientation of the irradiance sensing device 410, navigational functions, and so on.

In some embodiments, the present disclosure provides a device including a structure, and a plurality of photo sensors coupled to the structure. The photo sensors have different sensing orientations with respect to one another, and each of the photo sensors, in use, receives irradiance at a respective one of the plurality of sensing orientations. The different sensing orientations include at least five different sensing orientations. In some embodiments, the photo sensors have sensing surfaces that are arranged at the different sensing orientations (e.g., as shown in FIG. 3). In some embodiments, a housing (e.g., as shown in FIG. 6) has a plurality of surfaces that have the different sensing orientations, and the photo sensors receive light incident on the surfaces. In some embodiments, the housing may have a hemispherical or spherical shape, with light being incident at a plurality of different sensing orientations on the housing, and the plurality of photo sensors receive light incident on different portions of the hemispherical or spherical housing.

The sensing orientations of the photo sensors may be different from one another in terms of angle or position with respect to any reference point. For example, the sensing orientations may have different angles with respect to a reference point, which may be measured, for example, from a center of the structure to which the photo sensors are attached. Each of the photo sensors may be configured to receive light incident at a particular surface area or region (e.g., at a surface area of the openings 431 in the top enclosure 421 of the device 410 shown in FIG. 7).

In the description, certain specific details are set forth in order to provide a thorough understanding of various embodiments of the disclosure. However, one skilled in the art will understand that the disclosure may be practiced without these specific details. In other instances, well-known structures have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
  a structure;
  a plurality of photo sensors coupled to the structure, the photo sensors having different sensing orientations with respect to one another, each of the photo sensors, in use, receives continuous solar irradiance at a respective one of the plurality of sensing orientations; and
  a processor coupled to the plurality of photo sensors,
  wherein the different sensing orientations of the photo sensors include at least five different sensing orientations,
  the plurality of photo sensors are configured to simultaneously sense the solar irradiance from the sun at the at least five different sensing orientations,
  the processor is configured to:
    simultaneously determine a direct component and a scattered component of the simultaneously sensed solar irradiance,
    determine an azimuth angle and a zenith angle of the sun based on the simultaneously sensed irradiance and independent of time and location of the device,
    determine an orientation of the device with respect to a solar coordinate system based on the simultaneously determined azimuth angle, zenith angle, and direct and scattered components of the simultaneously sensed solar irradiance, the solar coordinate system being a coordinate system of the device with a Z-axis oriented toward a current sun position, and
    map the determined orientation of the device with respect to the solar coordinate system to a global coordinate system.

2. The device of claim 1 wherein the plurality of photo sensors includes at least one broadband photo sensor and at least one spectral sensor.

3. The device of claim 1, wherein the processor is configured to correlate irradiance information sensed by the plurality of photo sensors with image information acquired by an imaging device.

4. The device of claim 1 wherein the device is attached to an aerial vehicle.

5. The device of claim 1 wherein the processor is configured to determine the direct component and the scattered component of the simultaneously sensed solar irradiance based on only the simultaneously sensed solar irradiance and information indicative of the different sensing orientations of the photo sensors.

6. The device of claim 1 wherein the structure comprises a housing having a plurality of surfaces, the plurality of surfaces having different orientations with respect to one another,
  wherein the photo sensors are arranged at positions corresponding with the surfaces of the housing.

7. The device of claim 6 wherein the plurality of surfaces of the housing includes a lower surface, an upper surface and a plurality of inclined surfaces extending between the lower and upper surfaces, and the plurality of photo sensors are arranged on the upper surface and the inclined surfaces of the housing.

8. The device of claim 7 wherein the inclined surfaces of the housing include eight inclined surfaces, and the photo sensors, in use, receive irradiance incident on the eight inclined surfaces and the upper surface.

9. The device of claim 6 wherein the housing includes:
  a top enclosure including the plurality of surfaces having different orientations with respect to one another, and a plurality of irradiance sensing openings extending through the surfaces;
  an internal board, the plurality of photo sensors being attached to the internal board at positions corresponding with the irradiance sensing openings; and
  a bottom enclosure,
  wherein the top enclosure, the internal board, and the bottom enclosure are coupled to one another with the internal board positioned between the top enclosure and the bottom enclosure.

10. The device of claim 9, further comprising:
  a plurality of optical filters positioned over the photo sensors; and
  a plurality of optical diffusers positioned over the photo sensors.

11. The device of claim 10, further comprising:
  a plurality of light pipes positioned in the irradiance sensing openings.

12. A method, comprising:
  simultaneously sensing continuous solar irradiance from the sun by a plurality of photo sensors on a device, each of the photo sensors having a different sensing orientation;
  acquiring image information associated with a target object;
  simultaneously determining, by a processor, direct and scattered components of the solar irradiance simultaneously sensed by the plurality of photo sensors;
  simultaneously determining, by the processor, an azimuth angle and a zenith angle of the sun based on the simultaneously sensed solar irradiance and independent of time and location of the photo sensors;
  determining a reflectance of the target object based on the determined direct and scattered components and the acquired image information;
  determining an orientation of the device with respect to a solar coordinate system based on the simultaneous lye determined azimuth angle, zenith angle, and direct and scattered irradiance, the solar coordinate system being a coordinate system of the device with a Z-axis oriented toward a current sun position; and
  mapping the determined orientation of the device with respect to the solar coordinate system to a global coordinate system.

13. The method of claim 12, further comprising correlating the sensed solar irradiance with the image information at a time the image information is acquired.

14. The method of claim 12 wherein the target object includes a plant, the method further comprising:
determining a state of health of the plant based on the determined reflectance of the plant.

15. The, method of claim 12, further comprising: determining, by the processor, at least one of pitch, heading and roll of the device based on the simultaneously sensed solar irradiance by the plurality of photo sensors having different sensing orientations.

16. A method, comprising:
simultaneously sensing continuous solar irradiance, during flight of an aerial vehicle, by a plurality of photo sensors positioned on the aerial vehicle, each of the photo sensors having a different sensing orientation;
transmitting information indicative of the sensed solar irradiance from the plurality of photo sensors to a processor;
simultaneously determining, by the processor and independent of time and location of the photo sensors, an azimuth angle and a zenith angle of the sun and direct and scattered components of the solar irradiance simultaneously sensed by the plurality of photo sensors during the flight of the aerial vehicle;
determining an orientation of the aerial vehicle with respect to a solar coordinate system based on the simultaneously determined azimuth angle, zenith angle, and direct and scattered components of the simultaneously sensed solar irradiance, the solar coordinate system being a coordinate system of the aerial vehicle with a Z-axis oriented toward a current sun position, and
mapping the determined orientation of the aerial vehicle with respect to the solar coordinate system to a global coordinate system.

17. The method of claim 16, further comprising: determining, by the processor, at least one of pitch, heading and roll of the aerial vehicle based on the simultaneously sensed solar irradiance by the plurality of photo sensors having different sensing orientations.

18. The method of claim 17, further comprising:
navigating a flight of the aerial vehicle based on the determined at least one of pitch, heading and roll.

* * * * *

UNITED STATES PATENT AND TRADEMARK OFFICE
CERTIFICATE OF CORRECTION

| | | |
|---|---|---|
| PATENT NO. | : 11,290,623 B2 | Page 1 of 1 |
| APPLICATION NO. | : 16/037952 | |
| DATED | : March 29, 2022 | |
| INVENTOR(S) | : Felix Darvas | |

It is certified that error appears in the above-identified patent and that said Letters Patent is hereby corrected as shown below:

In the Claims

Column 12, Claim 12, Line 60:
"on the simultaneous lye"
Should read:
--on the simultaneously--.

Column 13, Claim 15, Line 8:
"The, method"
Should read:
--The method--.

Signed and Sealed this
Seventh Day of January, 2025

Derrick Brent
*Acting Director of the United States Patent and Trademark Office*